US008930362B2

(12) United States Patent
Pradhan et al.

(10) Patent No.: US 8,930,362 B2
(45) Date of Patent: Jan. 6, 2015

(54) SYSTEM AND METHOD FOR STREAK DISCOVERY AND PREDICTION

(75) Inventors: Satyabrata Pradhan, Sundargarh (IN); Radha Krishna Pisipati, Hyderabad (IN); Syed Mohammed, Hyderabad (IN)

(73) Assignee: Infosys Limited, Bangalore (IN)

( * ) Notice: Subject to any disclaimer, the term of this patent is extended or adjusted under 35 U.S.C. 154(b) by 559 days.

(21) Appl. No.: 13/111,259

(22) Filed: May 19, 2011

(65) Prior Publication Data

US 2012/0254176 A1   Oct. 4, 2012

(30) Foreign Application Priority Data

Mar. 31, 2011   (IN) .......................... 1055/CHE/2011

(51) Int. Cl.
*G06F 17/30* (2006.01)
*G06K 9/00* (2006.01)

(52) U.S. Cl.
CPC .................................. *G06K 9/0055* (2013.01)
USPC ........................... 707/736; 707/737; 707/748

(58) Field of Classification Search
None
See application file for complete search history.

(56) References Cited

U.S. PATENT DOCUMENTS

| 7,522,761 | B2 | 4/2009 | Prakash et al. | |
|---|---|---|---|---|
| 7,747,641 | B2 * | 6/2010 | Kim et al. | 707/769 |
| 7,765,172 | B2 * | 7/2010 | Chang et al. | 706/11 |
| 2006/0109522 | A1 | 5/2006 | Wang | |
| 2006/0110060 | A1 | 5/2006 | Wang et al. | |
| 2006/0241869 | A1 * | 10/2006 | Schadt et al. | 702/19 |
| 2007/0166707 | A1 * | 7/2007 | Schadt et al. | 435/6 |
| 2008/0033897 | A1 * | 2/2008 | Lloyd | 706/19 |
| 2009/0063557 | A1 * | 3/2009 | MacPherson | 707/103 R |

OTHER PUBLICATIONS

Gilovich T, Vallone R. and Tversky A. The Hot hand in basketball on the misperception of Random sequences. Cognitive Psychology, vol. 17, pp. 295-314, 1985.
De bondt W.F.M and Thaler R. Does the Stock Market Overreac?. Journal of Finance, vol. 40, pp. 793-805, Jul. 1985.
Camerer C.F. Does the Basketball Market believe in Hot Hand?. The American Economic Review, vol. 79, pp. 1257-1261, 1989.
Kareev Y. Positive bias in the perception of covariation. Psychological Review, vol. 102, pp. 490-502, 1995.

(Continued)

*Primary Examiner* — Angelica Ruiz
(74) *Attorney, Agent, or Firm* — Stephen M. Hertzler; Marc S. Kaufman; Reed Smith LLP

(57) ABSTRACT

The disclosed embodiment relates to identifying performance regions in time-series data. An exemplary method comprises identifying, with a computing device, one or more streaks in the time-series data based on at least one streak parameter, ranking, with a computing device, the identified streaks based on at least one characteristic of the identified streaks, and predicting, with a computing device, a future occurrence of at least one streak based on the characteristics of the identified streaks. The steps of identifying and ranking may be carried out using at least one of a linear graph method, a statistical based approach, a curve-line intersection method, and a hypothesis-based method, and the step of predicting the future occurrence of at least one streak may comprise predicting at least one of how long a current streak will continue, when a current streak will end, and when a new streak will begin. The disclosed embodiment also relates to a system and computer-readable code that can be used to implement the exemplary methods.

33 Claims, 8 Drawing Sheets

(56) References Cited

OTHER PUBLICATIONS

J. Albert and P. Williamson. Using Models/Data Simulations for Detecting Streakiness.The American Statistician, vol. 55, Issue 1, pp. 41-50, Feb. 2001.

Bruce D. Burns. The Hot Hand in Basketball; fallacy or Adaptive Thinking. In J. D. Moore and K. Stenning (Eds.), proceeding of the Twenty-third Annual Metting of the cognitive Science Society; pp. 152-157, 2001.

Bruce D. Burns. Belief in Hot Hand Improves performance: A mathematical Mode. In W.D. Gray and C.D. Schunn (Eds.), Proceedings of the Twenty-fourth Annual Meeting of Cognitive Science Society, pp. 991, 2002.

Bruce D. Burns. When it is adaptive to follow Streak: Variability and Stocks. In R. Alterman, D. Krish. Proceedings of the Twenty-fifth Annual Meeting of Cognitive Science Society, Mahwah, NJ: Erlbaum, 2003.

Jonathan J.Koehler, Caryn A.Conley. The Hot Hand Myth in Professional Basketball. Journal of Sport and Exercise Psychology, vol. 25, pp. 253-259, 2003.

Bar-Elia, Michael, et al. Twenty years of "hot hand" research: Review and critique. Sep. 2, 2005.

Theo Offerman and Joep Sonnemans. What's Causing Overreaction? An Experimental Investigation of Recency and the Hot Hand Effect. The Scandinavian Journal of Economics, vol. 106, No. 3, pp. 533-544, Sep. 2004.

Bruce D.Bums and Bryan Corpus. Randomness and inductions from streaks: Gambler's fallacy versus "Hot Hand". Psychonomic Bulletin and Review vol. 11, Issue 1, pp. 179-184, 2004.

Tae Young Yang. Bayesian Binary Segmentation Procedure for detecting Streakiness in Sports. Royal Statistical Society Series, vol. 167, Issue 2, pp. 627-637, 2004.

Erik M. Altmann and Bruce D. Burns. Streak biases in decision making: data and a memory model. Cognitive Systems Research, vol. 6, Issue 1, pp. 5-16, Mar. 2005.

Joseph Johnson and Gerard Tellis. Does the Stock Market Hype "Winners"? A Lab and Market Study. Triennail Choice Symposium. Jun. 2007.

M. Falk. A First Course on Time Series Analysis—Example with SAS. University of Wurzburg, pp. 199-204. Sep. 18, 2006.

Swati Sharma, Streak Identification and Streak Prediction in Time Series Data, M Tech Thesis, International Institute of Information Technology, Hyderabad, 2009.

* cited by examiner

*The Curve*

*First derivative of the curve*

Slopes very much comparable and mergeable

Slopes not comparable and non-mergeable

Slopes not comparable but mergeable

*An example n-array tree*

SYSTEM AND METHOD FOR STREAK DISCOVERY AND PREDICTION

RELATED APPLICATION DATA

This application claims priority to Indian Patent Application No. 1055/CHE/2011, filed Mar. 31, 2011, which is hereby incorporated by reference in its entirety.

FIELD OF THE INVENTION

The invention relates to identifying performance regions in data sets, more specifically, a system and method for detecting, identifying, ranking, and predicting streaks in time-series data sets.

BACKGROUND

In the present dynamic world, where decision making process for making highest profit by an individual or a company runs a risk of whirling out to be negative, minimizing the risk by considering consistent entity into decision making process is very vital. Exemplary areas where decision making processes are crucial include investment analysis, betting systems where player need to rely on companies and player/team in terms of future performance, and the like.

Presently there are many forecasting models used on time series data to forecast future performances and based on the predicted values decisions are taken. Besides forecasting approaches, models for detecting streak (consistent pattern in the time series) are also very crucial in finding low risk profitable business. Model/Data Simulation and Bayesian binary segmentation procedures are among the few streak identification approaches derived previously.

Existing model/data simulation techniques are typically based on the Markov switching model, which suggests to first converting the time series into binary data by applying threshold values. The model is parameterized by three numbers: the hot and cold probabilities $P_c$ (probability of hitting a cold state), $P_h$ (Probability of hitting a hot state) and a staying probability a. The model depends upon a Markov switching model to identify streakiness in a given time series and says, an entity switches between the hot and cold hitting states for different instances of time according to a Markov chain.

Bayesian binary segmentation relates to a segmentation procedure for locating the change-points and the associated success rate simultaneously. This procedure is based on a series of nested hypothesis test each using Bayesian factor or the Bayesian Information Criterion (BIC). This model goes on splitting a binary time series based on hypothesis test until no more change points are observed.

Using existing techniques can result in significant limitations in streak prediction including, for example, potential loss of information due to Binary conversion, impractical streak continuity prediction, a limited scope of applications due to Binary data support only, and the impracticality of assuming the presence of disjointed streaks.

In addition, existing streak identification algorithms do not focused on finding overlapping streaks. They either assume the whole time series as one streak or multiple disjointed streaks. But in practical cases, there might be streaks which are overlapping to each other.

There are also known algorithms which are capable of finding streaks from data provided the time series is binary in nature. But conversion of numerical time series to binary by just doing many-to-one mapping techniques using threshold values usually result in huge losses of information.

Furthermore, a streak can be defined as a period of consistent performance. In time series data, there might be certain length of data points where much irregularity is possibly observed, which may not be suitable to fall under a streak. So discontinuity in streaks is a very practical case, which has not been addressed using existing techniques.

In view of the above problems with existing streak identification techniques, there is a clear need to identify streaks in time series data and predict future streaks. The preferred embodiment described herein meets this need.

SUMMARY

The disclosed embodiment relates to a method for identifying a streak in a data set. The method preferably comprises identifying, by a computing device, a plurality of patterns within the data set, converting, by a computing device, the data set into a linear graph including a plurality of nodes, wherein each node is assigned an initial value based on one of the patterns identified within the data set, merging, by a computing device, one node with at least one adjacent node, thereby forming a merged node having an increased value based on the values of the first node and the adjacent node, and identifying, by a computing device, a streak based on the value of the merged node.

The disclosed embodiment further relates to a system for identifying a streak in a data set. The system preferably comprises a computing device configured to identify a plurality of patterns within the data set, a computing device configured to convert the data set into a linear graph including a plurality of nodes, wherein each node is assigned an initial value based on one of the patterns identified within the data set, a computing device configured to merge one node with at least one adjacent node, thereby forming a merged node having an increased value based on the values of the first node and the adjacent node, and a computing device configured to identify a streak based on the value of the merged node.

The disclosed embodiment also relates to computer-readable code stored on a computer-readable medium that, when executed by a processor, performs a method for identifying a streak in a data set. The method preferably comprises identifying, with a computing device, a plurality of patterns within the data set, converting, with a computing device, the data set into a linear graph including a plurality of nodes, wherein each node is assigned an initial value based on one of the patterns identified within the data set, merging, with a computing device, one node with at least one adjacent node, thereby forming a merged node having an increased value based on the values of the first node and the adjacent node, and identifying, with a computing device, a streak based on the value of the merged node.

The data sets disclosed herein may includes time series data, and may be in any format, such as a binary data set. In addition, the initial value of each node is preferably based on a group of data points within the data set. Furthermore, the steps of merging and identifying may be repeated until at least one streak condition is satisfied, the streak conditions corresponding to, for example, at least one of threshold performance, streak size, or streak separation.

The disclosed embodiment also relates to a method, system, and computer-readable code related to identifying performance regions in time-series data. The method comprises identifying, with a computing device, one or more streaks in the time-series data based on at least one streak parameter, ranking, with a computing device, the identified streaks based on at least one characteristic of the identified streaks, and predicting, with a computing device, a future occurrence of at least one streak based on the characteristics of the identified streaks. The streak parameters may include a threshold performance parameter and a streak length parameter. In addition, the steps of identifying and ranking may be carried out using at least one of a linear graph method, a statistical based approach, a curve-line intersection method, and a hypothesis-based method. Moreover, the characteristic used in the step of ranking the identified streaks may include the variations of the values inside the streaks. Furthermore, the step of predicting the future occurrence of at least one streak may comprise predicting at least one of how long a current streak will continue, when a current streak will end, and when a new streak will begin.

DETAILED DESCRIPTION

Figure 1:
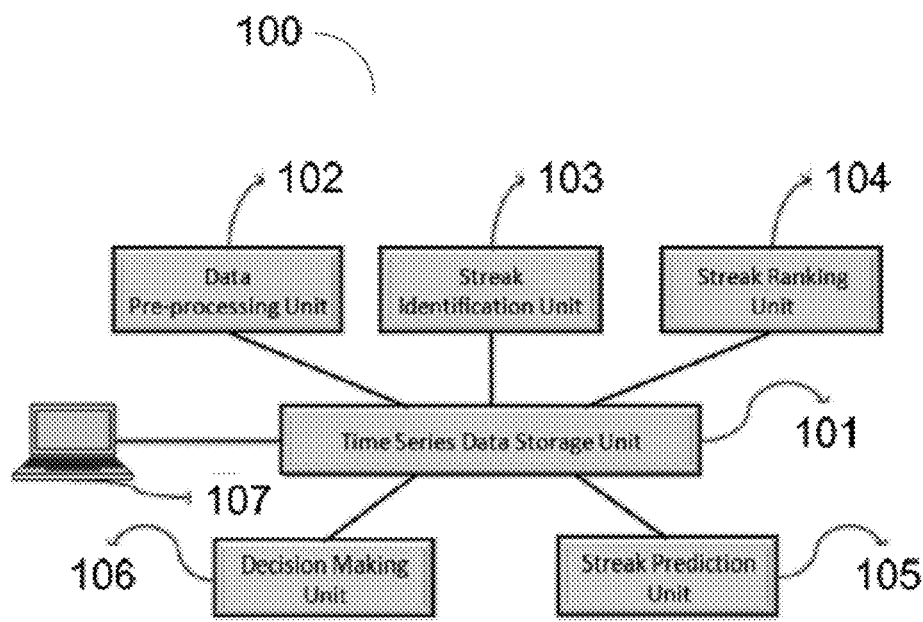
FIG. 1 illustrates an exemplary system of the disclosed embodiment.

The disclosed embodiments address limitations in the existing technologies by addressing the limitations surrounding use of binary time series data in real case scenarios. For example, it is generally necessary to deal with numerical time series data, and the numbers at different time periods have lot of relationships with the type of time series data being dealt with. Existing many-to-one mapping techniques are not suitable for this situation. Thus, the disclosed embodiments are capable of dealing with numerical time series and the underlying patterns in the time series efficiently. Furthermore, the disclosed embodiments are capable of dealing with overlapping streaks, including identifying, predicting, and ranking streaks using a goodness factor. In addition, the techniques described herein enable the processing of any data set into a form suitable for streak analysis without data loss.

As noted above, the disclosed embodiments provide novel techniques and tools to capture, analyze and identify streaks in time series data in binary as well as in numerical form, and predict future streaks. Specifically, the disclosed embodiment provides a tool with a preprocessing unit which is capable of decomposing time series data by filtering important underlying patterns like trend and cycles to prevent loss of information for binary streak identification methods. This approach is very useful in detecting important streaks such as positive streak (inclined) or negative streak (declined) corresponding to the nature of business that the time series deal with. The streak identification unit utilize algorithms that are capable of identifying multiple streaks, which can be overlapping in nature depicting the practical possibilities. The streak identification unit also incorporates ranking mechanism to rank the identified streaks in the order of their goodness, so that important streaks can be identified correctly. The disclosed embodiments also quantify streaks at different levels according to the amplitude of the time series data, which not only implicates the consistent performance of the business but also provides an indication of higher profit margin as the level of the streak increases and vice-versa.

The streak prediction units of the disclosed embodiment further utilize novel probabilistic models to predict the streaks, which add immense value to decision making process, as decisions are always taken by considering the future prospects of the business. The streak prediction unit proposed can estimate the following, for example, streak continuation (i.e. given a streak is continuing, will it continue in the next point?), streak termination (i.e. if the streak is continued, when will it be terminated?), and new streak starting point (i.e. if currently there is no streak, when will the next new streak start?).

The disclosed embodiment is preferably described as being used with time-series data sets. Exemplary uses of the disclosed embodiments include detection/prediction of vulnerable time zones in power utilization in a power distribution grid [Energy]; detection/prediction of discontinuities in signals (from medical tests like ECG) for monitoring patient health [Health care]; discovery of consistently performing stocks in share-market for stock investors [Finance]; selecting sports team based on players consistency in the past performance [Sports and Entertainment]; identifying fast (or slow) moving products in a market to regulate the production unit [Retail and Manufacturing].

The disclosed embodiments are novel over the existing techniques for detection/prediction of streaks for a variety of reasons, for example, by the disclosed embodiments' ability to handle real-time numerical time-series data preventing loss of information, identify overlapping streaks which are practically possible, rank the streaks using goodness factor by considering variance in the streak, smartly detect the outliers and abnormalities based on the streak information, predict streaks, and specify levels of streaks to detect shifts in a business growth. The disclosed embodiment helps to minimize operational risk related to streak prediction and provide low risk decision support to increase the success rate in a business.

FIG. 1 illustrates an exemplary system 100 of the disclosed embodiment. Time series data storage unit 101 stores time series data for streak analysis and Intermediate binary form of the time series data along with other statistical measures for the computation during the whole process. Data pre-processing unit 102 converts the available data source to the required format for Streak Analysis. Streak Identification unit 103 identifies the patterns in the time series data from unit 101, which possibly can be streaks, using various algorithms. Streak ranking unit 104 selects top-k streaks by sorting all possible streaks according to their "goodness factor", which is determined using statistical measures. Streak Prediction unit 105 checks the continuity of any existing streak or time for next coming streak in future. Decision making unit 106 makes decisions based on the streak analysis result to achieve a combination of low risked and high profitable business. Interactive GUI based presentation system 107 is a front-end interface for the system user.

As an overview, streaks identify consistent patterns in time series data. By definition, a streak is an unbroken series of events. For example, consider the following bit stream

1111110000001110101101010

For an example, the initial set of six "1"s, the set of six "0"s, and the next set of four "1"s represent identifiable streaks. The remaining numbers are not of much use since they provide little information about the consistency in the data. Thus, these numbers are referred to as bad streaks, which are not generally analyzed.

In a dynamic environment, streaks boast of being able to detect the change (or rather, the effect of the change on the statistic of interest) soon and are thus potentially very useful in domains such as the stock market. Consider the following situation:

For a biased coin, the probability of heads suddenly increases from say, 0.6 to 0.9 (maybe the coin was hammered!). Based on historical frequency (probability), this probability would only gradually change. However, the change in the bias immediately shows up in the form of a long streak of heads. Thus, streak statistics capture the change in the environment sooner. This is of great significance when the environment is variable (like the stock market).

Apart from the stock market, streaks also find useful applications in sports data analysis and other domains. Streak analysis can be said to consist of the following four parts: Detection (i.e. Does the data have streaks in it?), Identification (i.e. Identifying the streaks, if present), Ranking (i.e. Judging the streaks as to how good/bad they are), and Prediction (i.e. Predict future behavior of a currently running streak/new streak, etc.).

According to the disclosed embodiment, streaks can be identified in any type of data set. To do this most efficiently, it is preferred that the data set is first converted into a graphical pattern, herein referred to as the linear graph method, which is described below. This conversion is straightforward for bit-stream data sets. If the input is a set of real numbers, it is preferable that such inputs be converted bit-stream inputs consisting of "1"s and "0"s.

Figure 2:
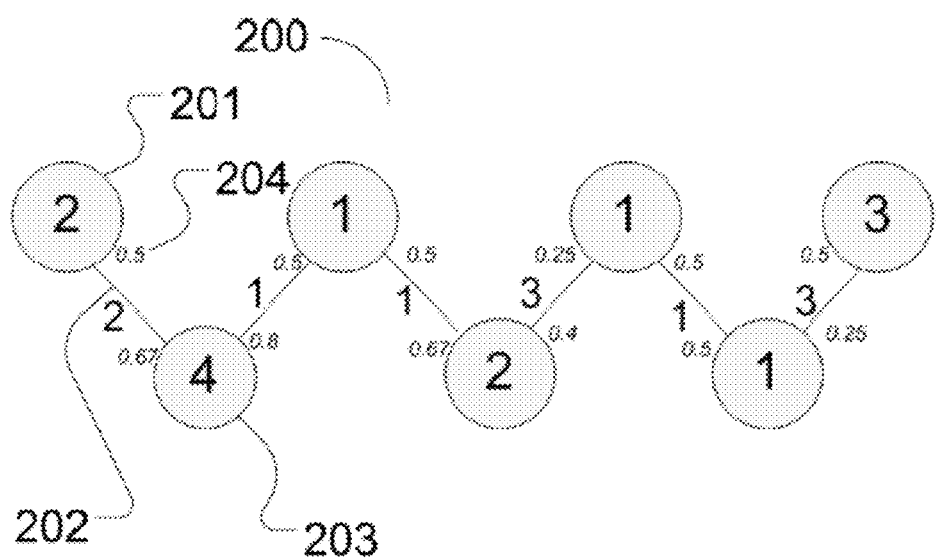
FIG. 2 illustrates an exemplary data set converted using the linear graph method.

FIG. 2 illustrates an exemplary data set converted using the linear graph method, which is disclosed below. Referring to FIG. 2, assume the following bit-stream data set:

11001111010110001010000111

First, adjacent "1"s and "0"s are grouped together, and converting them to a linear graph 200 by making "1" into as nodes and "0"s into edges. The nodes and edges are labeled with the count of consecutive "1"s as vertices and the edges are labeled with the count of consecutive "0"s. For example, node 201 is labeled with a "2" to reflect the first set of two "1"s in the data set. Similarly, edge 202 is labeled with a "2" to reflect the first set of two "0"s in the data set.

The numbers (<1) in italics adjacent to the vertices represent the contribution of the segment, be it the left contribution or the right contribution or both. Contribution denotes the value added by this segment upon merging with the segment on the right or the left. For example, if node 201 (value 2) is merged with node 203 (value 4), edge 202 (value 2) contributes with two "0"s. Thus, the merger calculation is as follow: 2×"1"+2×"0"=4 bits. The value added is 2×"1"/4 bits=0.5 per bit. Thus, the right contribution 204 of node 201 is 0.5. Note that this node does not have a left contribution.

The objective is to find the best streak, which is preferably the longest substring of the given bit string whose average value is greater than some threshold performance (perf) and length<some maximum length.

To do this, the first step is to identify the node with the largest value in the first iteration. In each step of iteration, this node is recursively merged with its neighbors as long as the resulting average value is greater than perf.

To decide whether to merge with the left node or the right node, the right contribution of the left node and the left contribution of the right node are considered, and the merger is completed with whichever is higher. After the merger, the values of the merged node, its left and right contributions are recalculated and modified appropriately. If both the contributions are the same, the node which has highest number of "1"s is preferably used.

Figure 3:
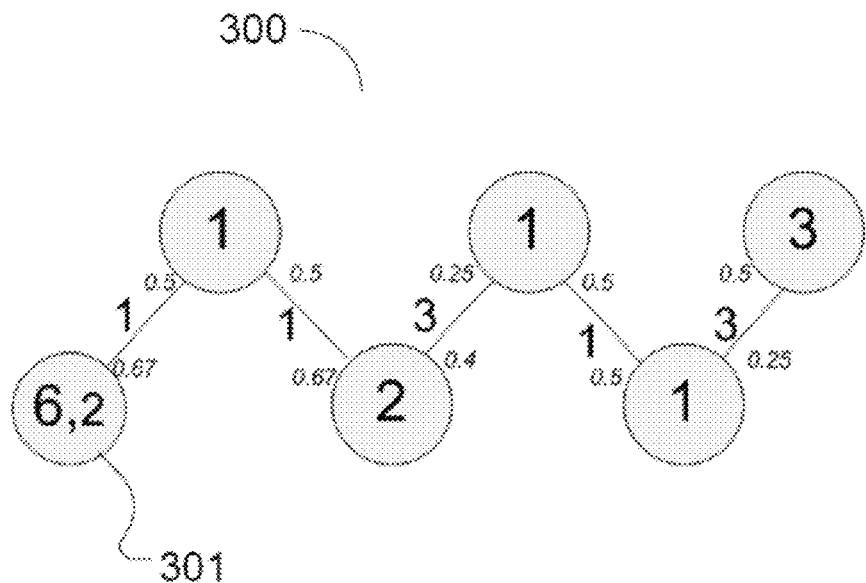
FIG. 3 illustrates a linear graph after one merger.

FIG. 3 shows linear graph 300, which is the same as linear graph 200 of FIG. 2 after one merger. Node 301 is the resulting merged node of nodes 201 and 203 from FIG. 2. In node 301, the "6" represents the combined total of the "1"s from nodes 201 and 203, and the "2" indicates the number of "0"s from edge 202. Mergers continue recursively until no more nodes can be merged. In the end, the node with the largest value is the longest streak satisfying the required conditions.

The next iteration step starts with a bit streak, but this time the node with second largest value of "1"s, and repeat all the steps again and so on. For example, consider the string as follows:

010101010101010101010111111111001011101110 1110111

The string of ten "1"s in the middle of the string is initially the highest valued string. To its right, there is an edge with a value of "2" followed by a node with a value of "1." To its left, there is an edge with a value of "1" followed by a node with a value of "1". As described above, the initial indication is that merging left is preferred. After merging, the situation is re-evaluated, and again merging left is seemingly preferred. This iterative process is continued. By using this process blindly, it can be overlooked that there are high valued nodes with values of "3" to the right of the smaller "1" node to the right. This global information can be difficult to detect.

Also, starting from the highest valued node is typically a good estimate, but is not always most beneficial. For example, assume the following string:

. . . 11111 . . . 111101111 . . . .

Although the string on the left of five "1"s is the highest value string, merging the two smaller strings on the right will produce optimal results. Thus, there is a clear benefit to searching the input string to determine the best streak satisfying the required conditions, by following multiple iterations.

Once all possible streaks are identified, some information could be repeating. Consider the following streak set:

[a, b], [a+2, b], [b−r, b+s]

Here [x, y] denotes the time period for a streak starting from time unit x to time unit y. So pruning the streaks is needed, as some of the streaks may be overlapping in nature. This is preferably accomplished by first deleting the streak if it is totally covered by a streak in the streak set, and then merging overlapping streaks if the merged pattern satisfies all the criteria, i.e. threshold performance (perf) and length<some maximum length.

Numerical Data—Statistical Based Approach

When numerical data is used, a statistical based approach can be utilized. A variable R can be used to indicate how many deviations away from the mean a particular streak is. According to the disclosed embodiment, the level of a streak can be defined not just in (integer*deviation) distances from the mean but also as (integer*fraction_of_deviation) distances. To accomplish this, a variable R-factor can be used. The R-factor indicates the separation between two successive R-levels in terms of a fraction of the deviation. By varying the R-factor, streaks can be ranked as required. However, the "credibility" of the streak should also be considered, and included in a ranking mechanism. The deviation within the streak is an obvious measure of how staggered the data is within the streak. A good streak should be less staggered, or in other words, have less deviation. For this reason, a very high level streak is considered to be good, even if its deviation is more than what would normally be desired. Thus, while the level R influences the ranking positively, the deviation within the streak influences it negatively. Thus, the ranking formula taking both these factors into consideration is as follows:

rankScore=R−dev

This ranking approach works will now be described in the following example. Assume an R-factor of 4. That is, the successive R-levels are separated by 0.25 deviations. For the sake of simplicity, assume that the deviation for the whole series is 1. Thus, the separation is 0.25. Now consider two streaks $S_1$ and $S_2$ at levels 1.25 and 1 respectively. Thus, $S_2$ is at a higher level than $S_1$ by virtue of the magnitude of the values in it. If the deviations within the streak for $S_1$ and $S_2$ respectively are 0.6 and 0.3, for example, then the ranking for $S_1$ and $S_2$ can be calculated as follows:

rankScore($S_1$)=1.25−0.6=0.65 rankScore($S_2$)=1−0.3=0.70 rankScore($S_2$)>rankScore($S_1$)

Thus, deviation can clearly affect the rank of a particular streak. A higher level streak might get a lower rank and vice versa depending on the combination of R and deviation.

EXAMPLE

Analysis of Critical Cricketer's Batting Using the Approach

Figure 4:
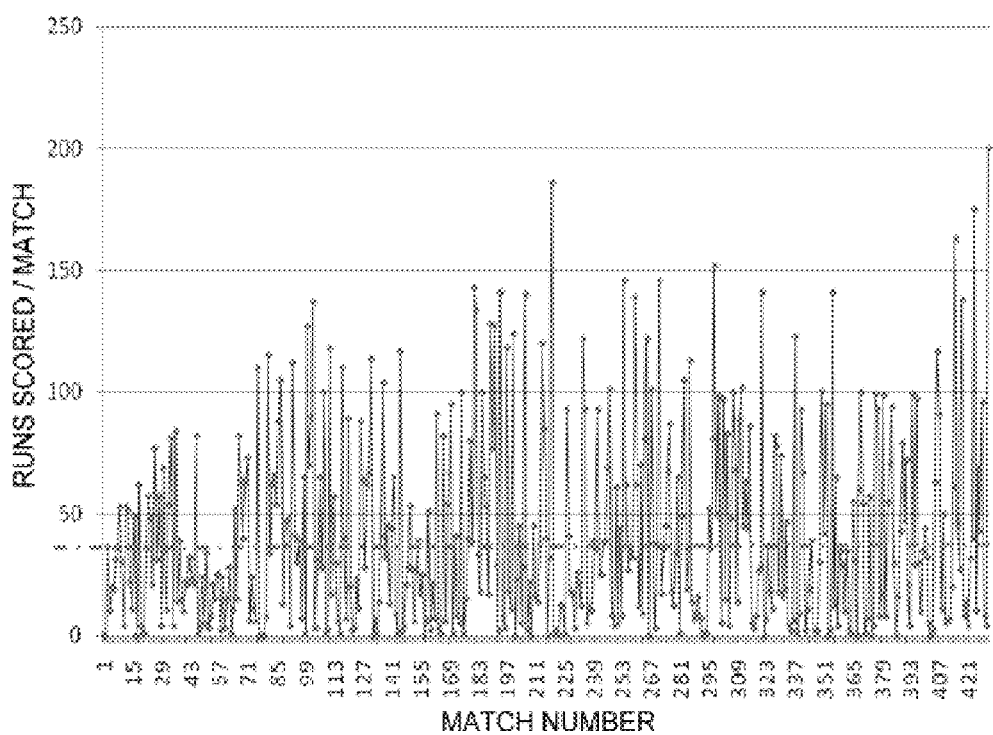
FIG. 4 illustrates a cricketer's batting performance.

The algorithm mentioned above in the above discussed approach has been applied to analyze the batting performance of the batsman. The data (one-day international scores until 431 innings that he batted since the start of his career) has been collected from a publicly-available website. The plot in FIG. 4 depicts the same. The dotted line represents the overall mean score.

The following parameters have been chosen:
Minimum streak size=10
R-Factor=4
Streak separation=20

The first two parameters have been explained before. So consider an example to understand streak separation. Suppose [162-218] is a streak. Many streaks are present in and around the same region in the time series. This might be due to some very good values in the region, but such information is redundant. For example, if the results show that [162-218], [165-219] are both streaks, it can be inferred that in the region [165-218], there are some good values, so inclusion or exclusion of some elements outside the good region does not affect the resultant performance in the streak much, and so, both these get classified as streaks. Even if only one of such near streaks is reported, not much information is lost. Moreover, the total number of streaks reported would be lesser and these would genuine streaks that carry useful information about the data.

The streak separation parameter is introduced in this context. A streak separation parameter valued 20 indicates that if two streaks are in the same level (as per R) and are such that they start within 20 points from each other's starting point and end within 20 points from each other's end point, only one of them will be reported. This would eliminate some unnecessary duplication in the results.

Using the above parameters, the following results were obtained. First, for the number of levels, the player's highest score is 200, lowest 0. The mean is approximately 40 runs, and the deviation is also 40. Thus, the highest level will be (200−40)/40=4 and the lowest level will be (0−40)/40=−1 as we see above. In between, each level is separated by (R-factor*deviation).

The best streak reported is from 180 to 190. Looking at the plot or the data, it is clear that this was indeed a very good streak for player with most of the scores well above the overall mean score. Further, looking at two streaks from level 0.5 and level 0.75, it can be determined that the level 0.5 streak (80-89) has a better rankScore than the level 0.75 streak (177-193). This is due to one streak having a lower deviation than the other.

As described herein, streaks in a given time series data set can be identified and ranked. However, the described embodiment can also be applied to real-life time series, such as the daily stock opening price of a company. In this scenario, it would be of great help to the user determination can be made about the overall nature of the data. For example, suppose a determination can be made from some analysis of the data prior to identifying the streaks that the stock prices of a particular company do not, in general, show an increasing/decreasing pattern but tend to have almost a constant price. This would attract share-buyers who do not aim for high returns but prefer a safe deposit in some company even if the returns expected are not very high, to invest in the company. Thus, it is useful to be able to provide an overall picture of the data to the user in addition to the streak information. Also, if it can be detected early that the data is not streaky in nature, there would not be a need to examine it at all for streaks.

Since the ultimate goal is the analysis of streaks, it would be beneficial if these determinations could be made using streak-related terms. Thus far, streaks have been described as regions of consistency in the data values. However, streaks can also exist in a certain region in time series data if a collection of points shows a consistent increase/decrease (or change in general). In the second case, what is streaky is the rate of change in the data values rather than the magnitude of the data value itself. It would be important to analyze these as well. One example of a domain that finds best use of these increasing/decreasing streaks is the stock market.

In this context, there are two distinct kinds of streaks: horizontal streaks (i.e. the data value is almost constant in a horizontal streak), and inclined streaks (i.e. the rate of change in the data value is almost constant). Inclined streaks can be positive, meaning the data value increases along the streak, or negative, meaning the data value decreases along the streak. By identifying inclined and horizontal streaks in a given time series data, determinations can be made about the overall nature of the data. There could as well be quadratic streaks (the rate of rate of change is consistent), and higher level streaks in principle, but the described embodiments instead focus on horizontal and inclined streaks.

It is preferable to determine if the data has horizontal/inclined streaks in it or both. The following additional features are also desirable when making these determinations:

Algorithms should be fast—As said earlier, the goal is to analyze for streaks. Algorithms should not consume huge amount of resources.

The determinations should be correct—Algorithms need to be correct (i.e. significant streaks should not be missed). However, it is generally acceptable to have an occasional false positive (i.e. detecting a streak that may not be significant).

The Curve-Line Intersection Method

Given a time series, assume that it is interpolated with a best fitting polynomial. Now consider a part of the time series, say, the time interval $[t_1-t_2]$. The objective is to determine how the time series behaves in this region. The algorithm is as follows:

Parameter: SEP, the line separation.

Figure 5:
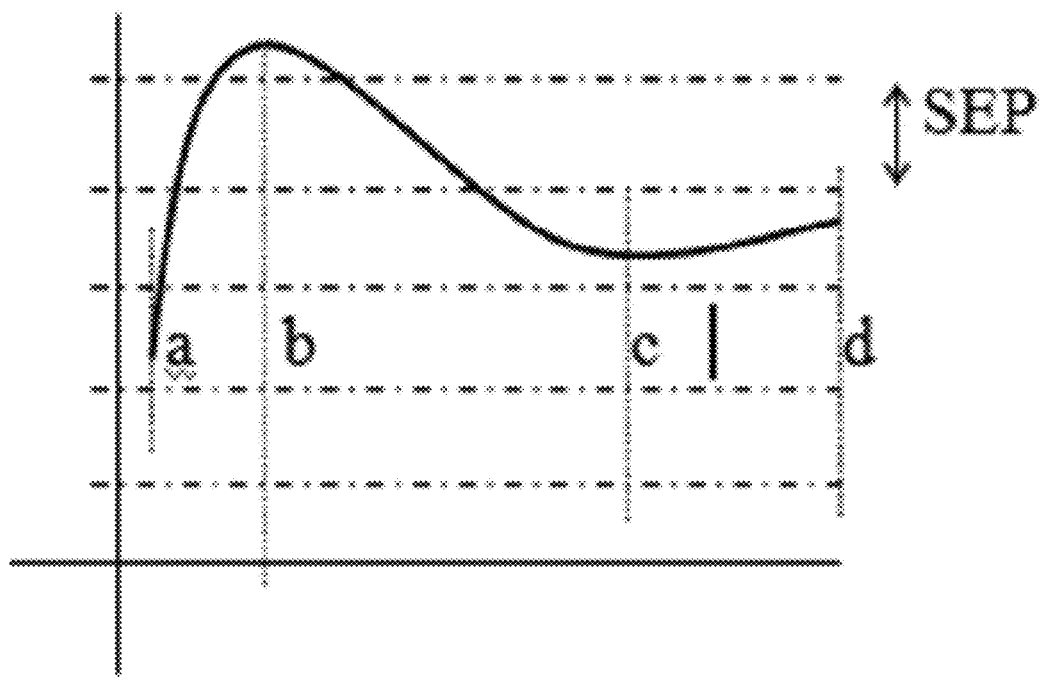
FIG. 5 is a graph illustrating an application of the curve-line intersection method.

As shown in FIG. 5, the y-axis (data axis) is partitioned into intervals of width SEP, referred to as sep-lines. The dotted lines (horizontal) represent the SEP partitions and the solid line represents the best fitting polynomial (not necessarily polynomial, could be any fitting curve) for the time series. The points a, b, c, d denotes various time points in the time series.

Now, in a specified time interval $[t_1-t_2]$, the number of times the polynomial curve cuts the sep-lines are counted. Suppose this count is equal to CUT_COUNT. This approximates how much the curve has moved up/down/both in the time interval. CUT_COUNT is now divided by the length of the time interval LEN $(=t_2-t_1)$ to obtain the average approximated slope AVG_APP_SLOPE. This value captures the behavior of the curve in the considered time interval.

The algorithm can now be verified as giving a good insight into the behavior of the curve. For example, consider the region [a-b]. In this region, the value of CUT_COUNT/LEN will be quite high, thus correctly reflecting the high slope in this region.

Now in the region [b-c], the value of CUT_COUNT/LEN will be moderate as is the slope (in the region [b-c], as compared to the region [a-b], the number of cuts is less and the length of the region is greater, so the measured value is going to be less than that in the previous case).

Finally, in the region [c-d], the count of CUT_COUNT/LEN will be zero reflecting that the curve is almost parallel to the x-axis (To capture the behavior of the curve better, for example, the not-so-horizontal behavior of the curve in [c-d], the value of SEP can be decreased.)

Figure 6:
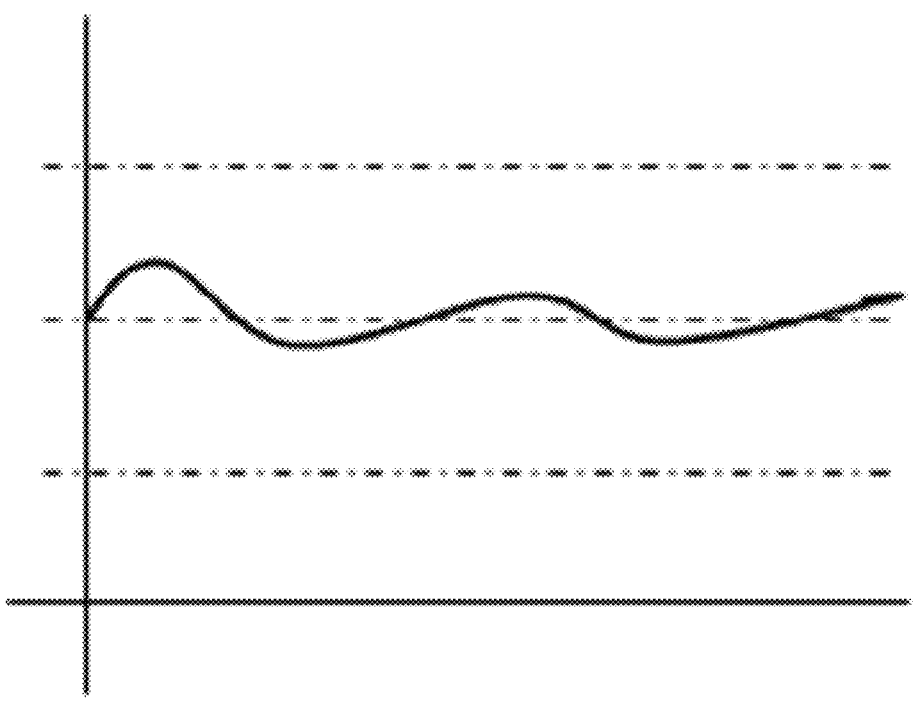
FIG. 6 is another graph illustrating an application of the curve-line intersection method.

At this point, the graph shown in FIG. 6 illustrates a case which might cause this particular algorithm to give unwanted results. Specifically, following the above process, the CUT_COUNT value in this case does not accurately reflect the up/down movement of the curve, as the curve grazes one particular sep-line. However, this is easily taken care of by a little book-keeping (e.g. by tracking the last sep-line crossed and the current sep-line crossed, CUT_COUNT can be incremented only if they are both not the same).

The advantage of this method is that it is very simple and efficiently captures the movement of the curve. Since the goal relates only to whether the time-series has inclined behavior or constant behavior, this method provides a fast method to do so. This is because only the number of times the curve cuts the sep-lines are counted, irrespective of whether the cut is made while going up or while coming down. This method only needs to be run once on the time-series data, and thus, is quite effective.

Hypothesis Based Method for Deciding the Behavior of the Curve

This method relates to providing a hypothesis regarding the behavior of a curve. Suppose the following:

Parameters: W, the window size; $f_0$, the threshold slope.

At random points in the time series, data of length W and using the Curve-Line Intersection Method described above, the approximate average slopes in these regions can be found. Call these $f_1, f_2, f_3, \ldots, f_n$. Using these sample values, the following tests are performed:

TEST 1—Testing the Data for Horizontal Streaks $H_0$: The time series data has characteristics of horizontal streaks $H_1$: The time series data does not have characteristics of horizontal streaks This test becomes:

$H_0$: $f < f_0(hor)$ $H_1$: $f >= f_0(hor)$

Here f denotes the actual slope of the time series.

TEST 2—Testing the Data for Inclined Streaks $H_0$: The time series data has characteristics of inclined streaks $H_1$: The time series data does not have characteristics of inclined streaks This test becomes:

$H_0$: $f > f_0(inc)$ $H_1$: $f <= f_0(inc)$

Here f denotes the actual slope of the time series.

Note that in both the above tests, the null hypothesis is that the data has characteristics of a particular kind of streaks, but not the other way round (that it does not). This is to conform to the earlier feature of the algorithm that it should not deny worthy data of a chance for analysis and it is acceptable even if it sometimes wrongly classifies unworthy data as fit for analysis. Thus, the starting assumption is that the data does have streaks of a particular kind and this is concluded as negative only if there is sufficient evidence against the null hypothesis.

In the above statements, actual slope refers to the slope that is expected in a region of the time series selected by a random choice of the starting point P and extending through a length W, the window size. By a suitable choice of the threshold slope (high for testing inclined and vice-versa) and an appropriate confidence level (a), the hypothesis is tested.

The first steps are to determine the distribution function of the random average slopes (using the method described below). Using this distribution, an α level confidence interval for f can be determined. By checking whether $f_0$ lies in agreement with the truth of the hypothesis, the hypothesis can be tested.

Once the hypotheses are tested, four cases as given below might arise, and certain actions may be required.

Case 1: $H_0$ is accepted in both TEST 1 and TEST 2. This means that it is not possible to reject, at the given confidence level, the possibility either that the data could be examined for horizontal streaks or that it could be examined for inclined streaks. So, the data should be analyzed for both horizontal and inclined streaks with an appropriately chosen threshold frequency.

Case 2: $H_0$ is accepted in TEST 1 but rejected in TEST 2. This means that it is possible to reject, at the given confidence level, the possibility that the data could contain inclined streaks but not so for the horizontal streaks. So, the data should be analyzed only for horizontal streaks, again with an appropriately chosen threshold frequency.

Case 3: $H_0$ is rejected in TEST 1 but not in TEST 2. Similar to Case 2, the data should be analyzed only for inclined streaks.

Case 4: $H_0$ is rejected in both TEST 1 and TEST 2. This means that in both the cases, there was sufficient evidence to conclude that the data does not have characteristics of the types of streaks of interest. Thus, it can be assumed that this data is not streaky, or it does not have any valid streaks of interest in it.

In order to be able to perform these hypotheses tests, the distribution of the average slopes $f_1, f_2, f_3, \ldots, f_n$, are needed. This is achieved in the method described below:

Obtaining the Probability Distribution of the Average Slopes

In the time series, consider each segment of length W. Obtain the approximate average slope in each of these segments using the method described previously. The frequency distribution of these slopes is the required distribution.

Figure 7:
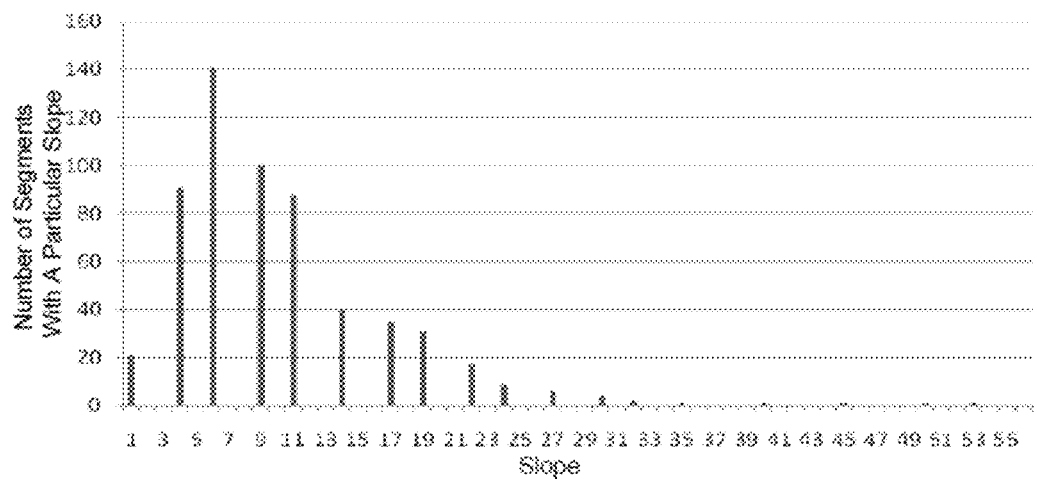
FIG. 7 is a graph showing the slope frequency distribution of a company.

One such distribution obtained for the daily stock open price data of a company (1989 days starting from Jan. 6, 2002) is shown in FIG. 7. (Note: The graph is pruned to show only the region of interest for discussion.)

From the graph, it can be inferred that the distribution of the slopes in the case of the company is similar to a Poisson distribution. Thus, the Poisson distribution model (with appropriate X) can be used to approximate this distribution and use it for testing the hypotheses. An important advantage of this method is that any model can be used to fit this data. Changing the model does not require any changes anywhere except in the selection of confidence intervals based on the underlying distribution of the data. Thus, this method provides the freedom to choose a better fitting model to the data, if possible. The Poisson distribution model is used for approximating the above data (look at the green curve that traces the y-value at each x-value).

Streak Identification

Given a time series data, the nature of the data can be deciphered to determine whether it contains horizontal streaks, inclined streaks, both or none. Next, the actual streaks should be identified. To accomplish this, the goal is to actually identify consistent patterns in the data, be it the consistency in the data values, or in the rate of change in the data values, or going even further, in the rate of rate of change in the data values. Going by this, the rate of change in the data seems to provide more useful information related to streaks than the data itself.

Figure 8:
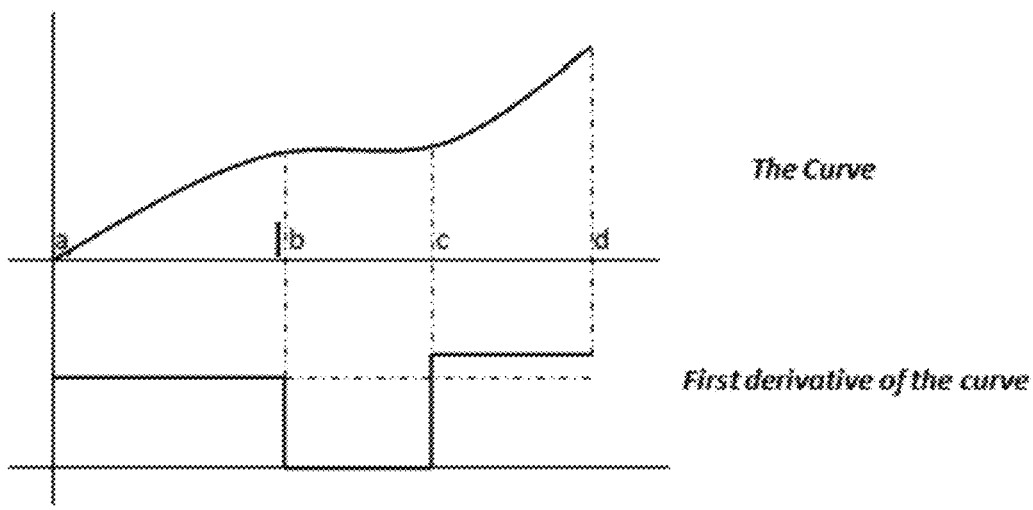
FIG. 8 is a graph showing an exemplary curve and its first derivative.

Consider the curve shown in FIG. 8, which depicts a curve and its first derivative. In the region [a, b], the curve has an increasing behavior, in [b, c], it is almost horizontal and in [c, d], it again increases. Observe that these inferences can be drawn also from the first derivative of the curve. In [a, b] the first derivative is a positive value (curve increasing). In [b, c], the first derivative is zero (curve constant). Again in [c, d], the first derivative is a positive value (curve increasing). This is exactly what was inferred looking at the curve. Further, the first derivative value in [c, d] is higher than that in [a, b] indicating that the rate of increase in [c, d] is greater than that the rate of increase in [a, b]. Thus, the first derivative allows the conclusion, for instance, that in addition to both [a, b] and [c, d] being regions of increasing streaks, [c, d] is a better streak than [a, b] in terms of the rate of increase.

Thus, the algorithm for identifying either of the streaks uses the first derivative of the data (rate of change in the data) at each point to decide whether or not to include that particular point in a streak. This algorithm is presented below. Note: The term point refers to an x-coordinate value and value to mean a y-coordinate value.

Parameters: The threshold slope ($f_0$), the minimum streak length (len).

The threshold slope is the limit of the slope that determines whether or not a particular streak could be classified as belonging to that category. The analysis seeks two kinds of streaks, consequently, two threshold slopes are needed—one for each kind of streak. Suppose $f_0^h$ refers to a horizontal threshold, and $f_0^i$ refers to an inclined threshold. So, for example, if at a particular point, the slope is $f > f_0^i$, then that point can be included in the inclined streak. If $f < f_0^i$, it would not be included in the inclined streak. (Note: Slope refers to the absolute value of the slope at each point).

Next, each category of streaks (inclined/horizontal) is identified in a distinct pass through the data, since there are distinct thresholds for distinct categories. If the slope at a particular point is less than $f_0^i$ as mentioned above, it only means that the point cannot be included in an inclined streak, and not that it could be included in a horizontal streak. The slope at each point is calculated by taking the absolute difference in the values at that point and its preceding point.

Horizontal Streak Identification i. Start by including the first point (point-1) in the data in a streak, say $S_1$.

ii. Calculate the slope at point-2, say f. If $f < f_0^h$, include point-2 in $S_1$, then move to point-3. Repeat step ii. As long as the condition is satisfied; keep moving forward including more and more points in the streak.

iii. If at a point, $f > f_0^h$, $S_1$ is terminated, and pushed into the list of horizontal streaks ($S_{hor}$), include this point in a new streak $S_2$, and repeat step ii.

iv. Once the whole data is seen, $S_{hor}$ is filtered to remove streaks whose size is less than the minimum streak length. The remaining streaks are the horizontal streaks from the data that is required.

Inclined Streak Identification

Figure 9:
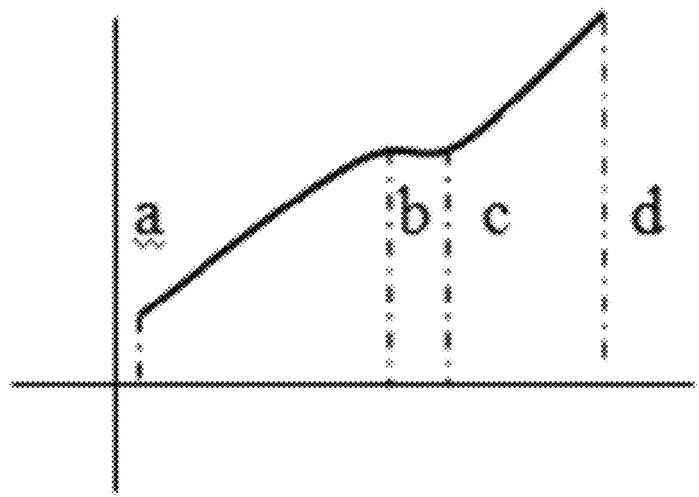
FIG. 9 is a graph showing time-series data.

The idea remains the same as in horizontal streak identification, but the satisfying condition to check for now becomes $f > f_0^i$ and a particular streak is terminated when $f < f_0^i$. After having done steps i through iv as before, a set of valid streaks is obtained in $S_{inc}$. As compared to horizontal streak identification, streaks are merged whenever possible. For example, consider the curve shown in FIG. 9, which depicts some time series data. Clearly, [a, b] and [c, d] represent two increasing streaks and [b,c] represents a short horizontal region. However, it would not be unacceptable to say also, that the whole of [a, d] is an increasing streak. This is because there is only a comparatively small region [b, c] inside [a, d] that does not represent a streak. Also, in [b, c] the data values are not increasing, but they are not decreasing either. Thus, there is no harm in merging the two streaks [a, b] and [c, d] into a single larger streak [a, d] and saying that the curve has increasing behavior in the whole of [a, d].

Figure 10:
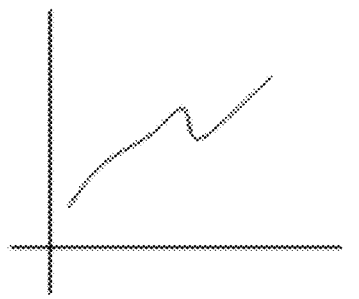
FIG. 10 is a series of graphs showing various time-series data plots.
Figure 10:
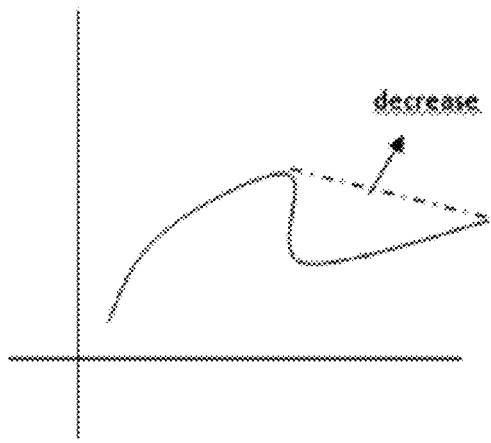
Figure 10:
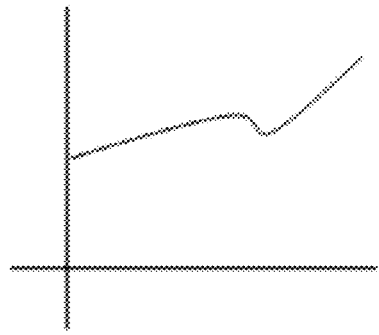

Assume a parameter, referred to as the tolerance (TOL), that denotes the maximum separation between two consecutive streaks to be able to merge them. Given the set $S_{inc}$, which includes the first two streaks; call them $S_1$ and $S_2$. The following conditions need to be satisfied for $S_1$ and $S_2$ to be merged: First, $S_1$ and $S_2$ should be both either increasing streaks or decreasing streaks. Streaks are determined to be either an increasing or a decreasing streak by taking the difference between two successive values in the streak. If this difference is positive, then it is an increasing streak, otherwise it is a decreasing streak. Next, the separation between the starting point of $S_2$ and the ending point of $S_1$ should be less than TOL. Finally, the interim points between the two streaks, when included with either of the streaks, should still result in the average slope being greater than the threshold. The intuition behind this condition is that if the inclusion of interim points results in acceptable average slope for both the streaks, both these streaks are comparable in a way that is good enough to be merged. To understand this, consider the cases shown in FIG. 10, keeping in mind that an inclined streak should contain an almost continuous increasing/decreasing set of points.

If the above conditions are satisfied, a new streak ranging from the starting point of $S_1$ to the ending point of $S_2$ can be added to the set $S_{inc}$ and $S_1$ and $S_2$ can be removed. Next, the analysis can continue with the newly formed streak and its successor and continue the merging process. When all the suitable streaks in $S_{inc}$ have been merged, $S_{inc}$ contains the desired set of inclined streaks.

Ranking Streaks

Now that streaks have been identified in a given time series data, the next step is to rank the streaks. A key aspect of the ranking procedure is to compare among similar kind of streaks (increasing/decreasing/horizontal). This approach was chosen because comparison among distinct kinds of streaks is not meaningful.

Assumed a new statistic, Z', which capture the variation of the values inside a streak using the following formula:

$$Z'=(\Sigma Y(i)-Y(avg))/l$$

where l denotes the length of the streak, Y(i) denotes a particular value in the streak and Y(avg) denotes the mean of the values in the streak.

For increasing streaks:

$$rankScore(i) = l(i) * (m(i) - Z'(i)) \bigg/ \sum_i (l(i) * m(i))/N(inc)$$

where m(i) denotes the average slope in the streak, and N(inc) is the number of increasing streaks.

For decreasing streaks:

$$rankScore(i) = l(i) * (m(i) - Z'(i)) \bigg/ \sum_i (l(i) * m(i))/N(inc)$$

For horizontal streaks:

$$rankScore(i)=\mu(i)-(Z'(i)*l')$$

where l' denotes the average length of a horizontal streak.

Streak Prediction

The above algorithms and approaches are useful for the detection, identification and ranking of streaks in data that captured the behavior of a particular statistic of interest over a given period of time in the past. In the sections below, methods for predicting the behavior of streaks in the near future are described. Streak prediction is perhaps the most important aspect of streak analysis and all the methods for identification and ranking discussed above can be said to build up, in a way, towards streak prediction.

Assume data from $t_1$ through $t_n$, where each $t_i$ denotes a point of time, with a goal of predicting streak behavior beyond $t_n$ using knowledge gained by analyzing the data from $t_1$ through $t_n$. Specifically, the objective is to predict the following: Streak continuation (Assume that a streak is identified in the data from $t_k$ (k<n) to $t_n$. Is this streak going to continue beyond $t_n$?), Streak termination (If it is determined that the streak is going to continue, until what point of time in future is it likely to continue?), and streak start (Assume a streak runs from $t_a$ to $t_b$ (a,b<n) but when the end of the data is reached, there is no streak running. When is it likely that a new streak will start?).

The first step is to analyze the given data and then use this information to predict future behavior. The algorithm can be described as follows. First, identify streaks in the given data using the deviation based approach discussed earlier. Assume these streaks are in a set S.

Normalize the time series data—replace the value at each point $val(t_i)$ by the following:

$$ZScore(i)=(val(i)-\mu)/\sigma$$

where $\mu$ denotes the overall mean over the given time series and $\sigma$ denotes the deviation for the same.

Discretize the normalized data—convert the data into discrete states. In order to discretize the data, the 'floor' is determined. For example, 2.3 becomes state 2; 3.6 becomes state 3; etc.

Generate a Probability State Transition Matrix (PSTM)—The PSTM is a 2-d array, where each element PSTM[i][j] contains the probability of the transition from a state i to a state j. This is calculated as follows:

$$PSTM[i][j]=Count[i,j]/Count[i]$$

where Count[x] denotes the number of occurrences of x in the discretized time series and x could be a single state or a set of co-occurring states (by co-occurrence we mean that a set of states, say a, b, c, . . . occur in the time series in consecutively and in the same order as mentioned above).

Generate the Confidence Matrix (Conf)—The Confidence Matrix contains information about the co-occurrence of states in the streaks identified so far. It denotes the conditional probability that two states i, j co-occur inside a streak, given that they have occurred. It can be populated using the following formula:

$$Conf[i][j] = \frac{NumStk(i, j)}{Num(i, j)}$$

where NumStk(i,j) denotes the number of co-occurrences of the states i,j inside streaks while Num(i,j) denoted the total number of co-occurrences of i,j in the given data.

Figure 11:
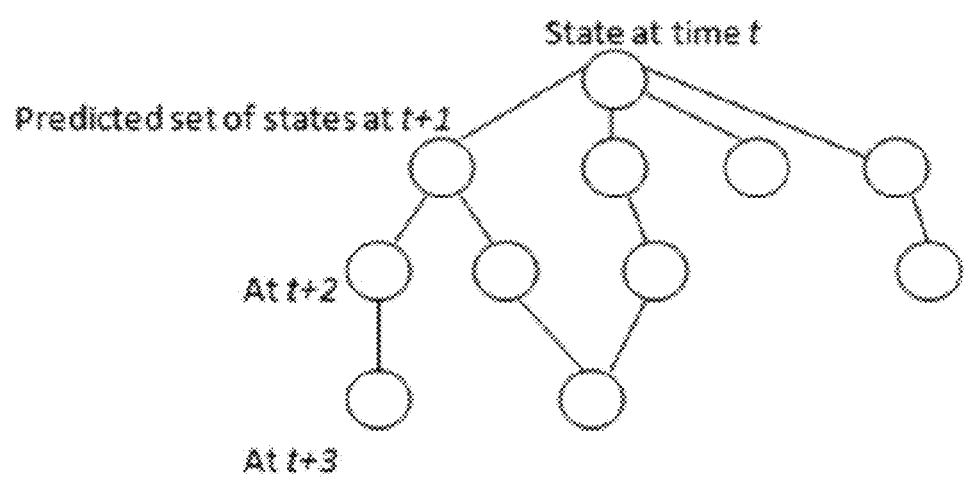
FIG. 11 shows an exemplary n-array tree.

Generate the n-array tree—The n-array tree shown in FIG. 11 is a representation of the set of predicted states at any point of time in the future from the present point of interest t, at t+1, t+2 etc.

The prediction is then completed using the following parameters: MinStreak-Length, MaxDeviation, StateThresholdProb, StreakThresholdProb MinStreak-Length is the minimum streak length. MaxDeviation is the user set parameter for the threshold deviation in the deviation based approach. StateThresholdProb denotes the average tendency of transition from one state to another in the given time series data. StreakThresholdProb is the average probability of a streak. The probability of a streak is taken to be the product of successive state transition probabilities, using the law of multiplication in simple probability. They are calculated as follows:

$$StateThresholdProb = \forall \text{ states } i, j \frac{\sum PSTM(i, j)}{\text{Number of states}}$$

$$StreakThresholdProb = \forall \text{ streaks } s, \frac{\sum Probability(s)}{\text{Number of streaks}}$$

$$Probability(s) = \forall [i, j] \in s, \prod PSTM[i][j]$$

The idea is to predict a set of states that might occur next (at t+1) based on the last state (at t) encountered and report from these states only those states as valid which may cause the occurrence/termination/continuation of streaks. The generic algorithm with three levels of pruning can be described as follows:

From all the states (say set T), select those states (i) whose probability of transition from the last state (as given by PSTM[last-state][i]) is greater than a selected threshold—the StateThresholdProb. All other states are pruned. This results in the set of states into which the transition from last-state is possible (say set T1). From these, only those states are selected which do not make the new streak probability less than a selected threshold—the StreakThresholdProb. All other states are pruned. The new streak probability is calculated as follows:

newStreakProb=LatestStreakProb*PSTM[laststate][$i$]
*Conf[laststate][$i$]

where i denotes a state from T1.

The next test is to select the final set of streaks from the remaining streaks (T2). This is done using the deviation based approach to test for the deviation to be less than a chosen threshold (MaxDeviation). Only those states that satisfy this criterion are selected to be the final valid set of streaks (T3). The rest of the states are pruned. This method can be used for each kind of prediction as follows:

Streak Continuation:

The procedure is exactly as described above where the LatestStreak is the streak whose continuation is to be checked for. If a non-empty set $T_3$ is found, the streak could continue and the any of the set of states $T_3$ could be predicted to be the successor states (for instance, the state which has the maximum transition probability could be chosen as the predicted successor state).

Streak Termination:

With LatestStreak as the streak which has to be tested for termination, predictions continue for t+1, t+2, t+3 etc. as long as there is continuity of the streak. Once a time is encountered with an empty $T_3$ set, that point is considered to be the termination point for the streak.

Streak Starting:

Suppose at the last-state, there are not any running streaks. The above levels of pruning can be performed with the last (MinStreak-Length−1) elements as the LatestStreak. If an empty $T_3$ is obtained, each of the states in $T_1$ are considered individually as having occurred, and are pushed onto a queue. For every state, the last MinStreak-Length−1 is checked to see if the beginning of a streak is encountered. If so, that time point is considered to be the potential starting point for the next streak. If not, $T_1$ is generated with this state as last-state, they are pushed into the queue, and the next node from the queue is considered. The process ends when all the states have been considered in the initial $T_1$ (or in other words, the set of predicted states at time t+1).

Figure 12:
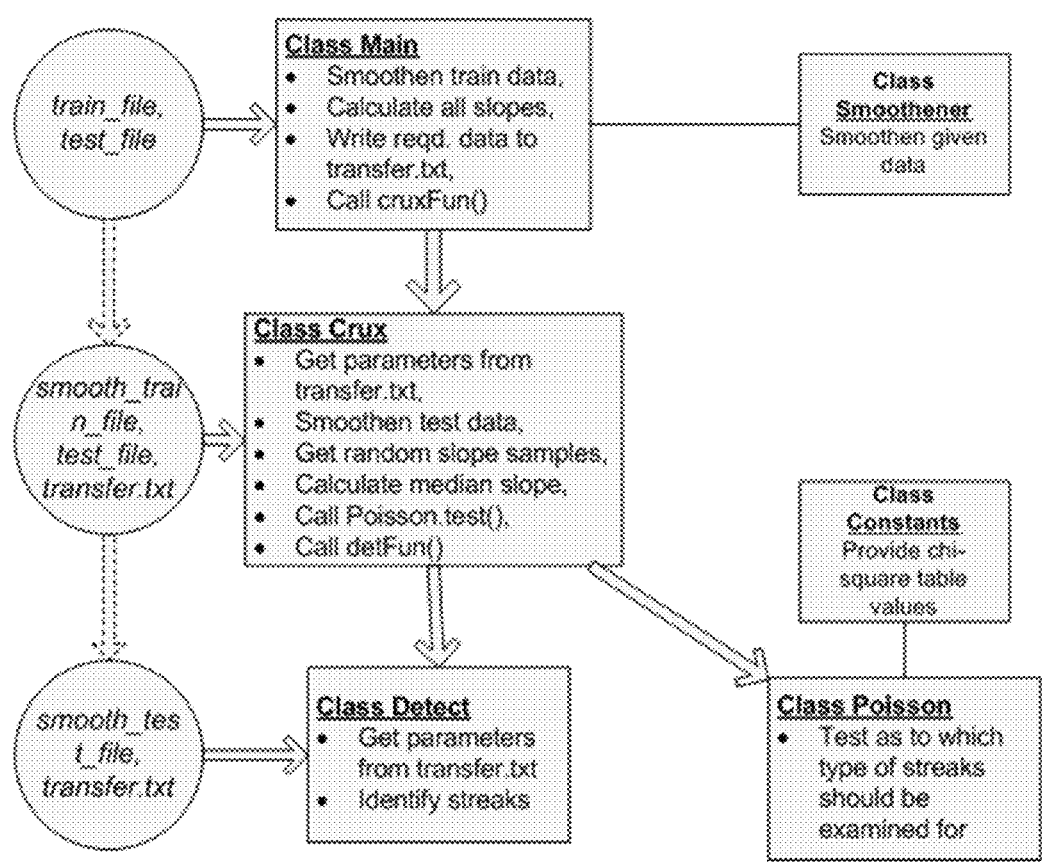
FIG. 12 is a flow-chart summarizing the code and algorithms utilized in the disclosed embodiment.

Thus, the disclosed embodiments provides a way to identify consistent performance regions on a time-series data. The method provided facilitates streak identification and prediction. Unlike forecasting approaches, the system provided is capable of ranking streaks and, thereby, enabling the range of applicable regions during prediction. The study helps in predicting profitable regions with limited risk. The flow chart shown in FIG. 12 summarizes the organization of the codes and algorithms described herein.

Figure 13:
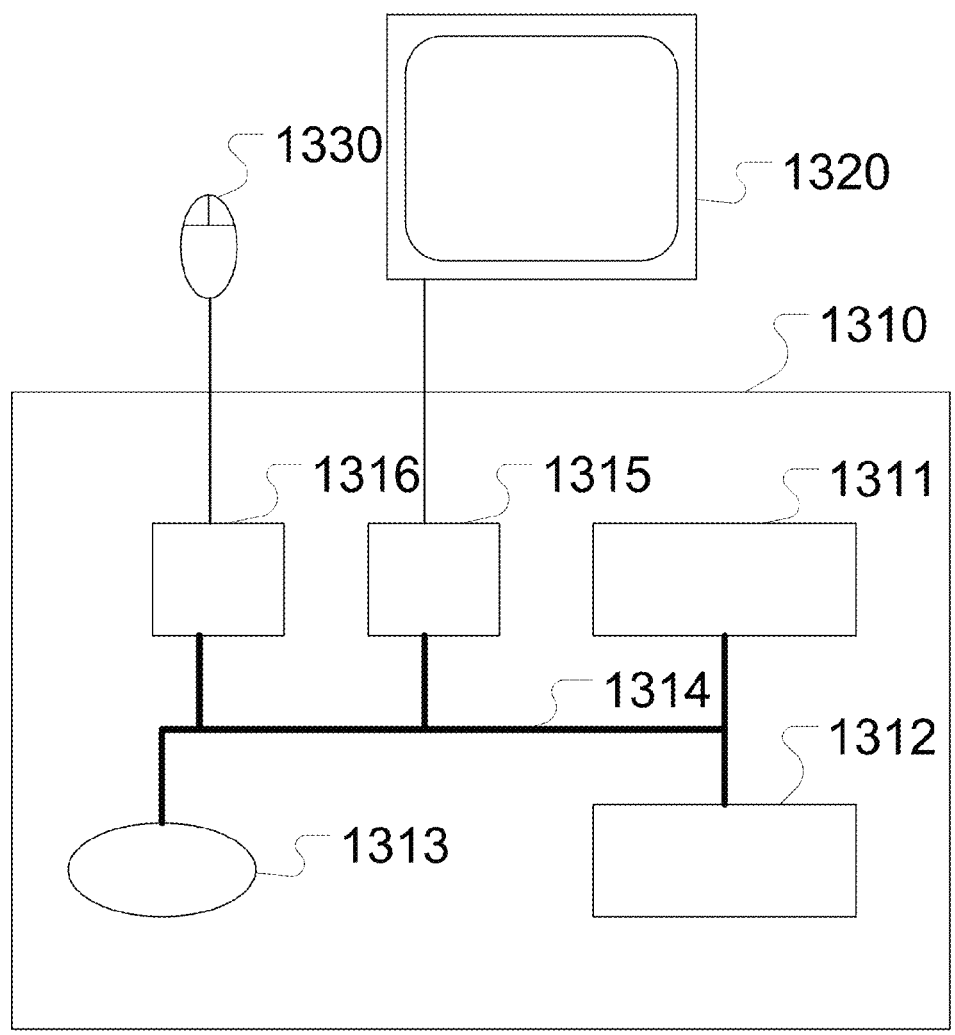
FIG. 13 illustrates an exemplary computing device useful for implementing systems and performing methods disclosed herein.

These embodiments may be implemented with any suitable hardware and/or software configuration, including, for example, modules executed on computing devices such as computing device 1310 of FIG. 13. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1310 has one or more processing device 1311 designed to process instructions, for example computer readable instructions (i.e., code) stored on a storage device 1313. By processing instructions, processing device 1311 may perform the steps set forth in the methods described herein. Storage device 1313 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1310 additionally has memory 1312, an input controller 1316, and an output controller 1315. A bus 1314 operatively couples components of computing device 1310, including processor 1311, memory 1312, storage device 1313, input controller 1316, output controller 1315, and any other devices (e.g., network controllers, sound controllers, etc.). Output controller 1315 may be operatively coupled (e.g., via a wired or wireless connection) to a display device 1320 (e.g., a monitor, television, mobile device screen, touch-display, etc.) in such a fashion that output controller 1315 can transform the display on display device 1320 (e.g., in response to modules executed). Input controller 1316 may be operatively coupled (e.g., via a wired or wireless connection) to input device 1330 (e.g., mouse, keyboard, touch-pad, scroll-ball, touch-display, etc.) in such a fashion that input can be received from a user (e.g., a user may input with an input device 1330 a dig ticket).

Of course, FIG. 13 illustrates computing device 1310, display device 1320, and input device 1330 as separate devices for ease of identification only. Computing device 1310, display device 1320, and input device 1330 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 1310 may be one or more servers, for example a farm of networked servers, a clustered server environment, or a cloud network of computing devices.

While systems and methods are described herein by way of example and embodiments, those skilled in the art recognize that the systems and methods for identifying and predicting streaks are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A method for identifying a streak in a data set, the method comprising:
   identifying, by one or more computing devices including one or more processors, a plurality of patterns within the data set, the data set being a binary data set including only "1"s and "0"s;

converting, by the one or more computing devices including the one or more processors, the data set into a linear graph including a plurality of nodes and linking edges, wherein each node is assigned an initial value based on a count of consecutive "1"s identified within the data set and each linking edge is assigned an initial value based on a count of consecutive "0"s identified within the data set;

merging, by the one or more computing devices including the one or more processors, one node with at least one adjacent node, thereby forming a merged node having an increased value based on the values of the one node and the adjacent node; and identifying, by the one or more computing devices including the one or more processors, a streak based on the value of the merged node.

2. The method of claim 1, wherein the steps of merging and identifying are repeated until at least one streak condition is satisfied.

3. The method of claim 2, wherein the streak condition corresponds to at least one of threshold performance value, streak size, or streak separation.

4. The method of claim 1, wherein merging continues recursively until no more nodes can be merged.

5. The method of claim 1, wherein a decision is made whether to merge a node with an adjacent left node or an adjacent right node by considering a right contribution of the adjacent left node and a left contribution of the adjacent right node and completing the merger with whichever contribution is higher.

6. The method of claim 1, wherein the streak is a consistent pattern in a time series.

7. A system for identifying a streak in a data set, the system comprising:

a computing device including one or more processors configured to identify a plurality of patterns within the data set, the data set being a binary data set including only "1"s and "0"s;

a computing device including one or more processors configured to convert the data set into a linear graph including a plurality of nodes and linking edges, wherein each node is assigned an initial value based on a count of consecutive "1"s identified within the data set and each linking edge is assigned an initial value based on a count of consecutive "0"s identified within the data set;

a computing device including one or more processors configured to merge one node with at least one adjacent node, thereby forming a merged node having an increased value based on the values of the one node and the adjacent node; and a computing device including one or more processors configured to identify a streak based on the value of the merged node.

8. The system of claim 7, wherein the steps of merging and identifying are repeated until at least one streak condition is satisfied.

9. The method of claim 8, wherein the streak condition corresponds to at least one of threshold performance value, streak size, or streak separation.

10. The system of claim 7, wherein a decision is made whether to merge a node with an adjacent left node or an adjacent right node by considering a right contribution of the adjacent left node and a left contribution of the adjacent right node and completing the merger with whichever contribution is higher.

11. The system of claim 7, wherein the streak is a consistent pattern in a time series.

12. Computer-readable code stored on a computer-readable medium that, when executed by a processor, performs a method for identifying a streak in a data set, the method comprising:

identifying, with one or more computing devices including one or more processors, a plurality of patterns within the data set, the data set being a binary data set including only "1"s and "0"s;

converting, with the one or more computing devices including the one or more processors, the data set into a linear graph including a plurality of nodes and linking edges, wherein each node is assigned an initial value based on a count of consecutive "1"s identified within the data set and each linking edge is assigned an initial value based on a count of consecutive "0"s identified within the data set;

merging, by the one or more computing devices including the one or more processors, one node with at least one adjacent node, thereby forming a merged node having an increased value based on the values of the one node and the adjacent node; and identifying, by the one or more computing devices including the one or more processors, a streak based on the value of the merged node.

13. The computer-readable code of claim 12, wherein the steps of merging and identifying are repeated until at least one streak condition is satisfied.

14. The computer-readable code of claim 13, wherein the streak condition corresponds to at least one of threshold performance value, streak size, or streak separation.

15. The computer-readable code of claim 12, wherein a decision is made whether to merge a node with an adjacent left node or an adjacent right node by considering a right contribution of the adjacent left node and a left contribution of the adjacent right node and completing the merger with whichever contribution is higher.

16. The computer-readable code of claim 12, wherein the streak is a consistent pattern in a time series.

17. A method for identifying performance regions in time-series data, the method comprising:

identifying, with one or more computing devices including one or more processors, one or more streaks in the time-series data based on at least one streak parameter;

ranking, with the one or more computing devices including the one or more processors, the identified streaks based on at least variations of values inside the streaks, wherein streaks are compared among similar kinds of streaks such that steaks with increasing variations are compared, streaks with decreasing variations are compared, and streaks with relatively constant variations are compared; and predicting, with the one or more computing devices including the one or more processors, a future occurrence of at least one streak based on characteristics of the identified streaks.

18. The method of claim 17, wherein the streak parameters include a threshold performance parameter and a streak length parameter.

19. The method of claim 17, wherein the steps of identifying and ranking are carried out using at least one of a linear graph method, a statistical based approach, a curve-line intersection method, and a hypothesis-based method.

20. The method of claim 17, wherein the step of predicting the future occurrence of at least one streak comprises predicting at least one of how long a current streak will continue, when a current streak will end, and when a new streak will begin.

21. The method of claim 17, further comprising:
calculating, with the one or more computing devices including the one or more processors, variation (Z') of values inside a particular streak as follows:

$$Z'=(\Sigma Y(i)-Y(\text{avg}))/l$$

wherein l denotes a length of the streak, Y(i) denotes a particular value in the streak and Y(avg) denotes a mean of values in the streak.

22. The method of claim 21, further comprising:
calculating, with the one or more computing devices including the one or more processors, rank of increasing streaks as follows:

$$rankScore(i) = l(i)*(m(i) - Z'(i)) \Big/ \sum_i (l(i)*m(i))/N(inc)$$

wherein m(i) denotes an average slope in the streak, and N(inc) denotes number of increasing streaks;
calculating, with the one or more computing devices including the one or more processors, rank of streaks with relatively constant variations as follows:

$$rankScore(i)=\mu(i)-(Z'(i)*l')$$

wherein l' denotes the average length of a horizontal streak; and
calculating, with the one or more computing devices including the one or more processors, rank of decreasing streaks as follows:

$$rankScore(i) = l(i)*(m(i) - Z'(i)) \Big/ \sum_i (l(i)*m(i))/N(inc).$$

23. The method of claim 17, wherein the streak is a consistent pattern in a time series.

24. A system for identifying performance regions in time-series data, the system comprising:
a computing device including one or more processors configured to identify one or more streaks in the time-series data based on at least one streak parameter;
a computing device including one or more processors configured to rank the identified streaks based on at least variations of values inside the streaks, wherein streaks are compared among similar kinds of streaks such that steaks with increasing variations are compared, streaks with decreasing variations are compared, and streaks with relatively constant variations are compared; and
a computing device including one or more processors configured to predict a future occurrence of at least one streak based on characteristics of the identified streaks.

25. The system of claim 24, wherein the streak parameters include a threshold performance parameter and a streak length parameter.

26. The system of claim 24, wherein the computing devices configured to identify and rank are further configured to identify and rank using at least one of a linear graph method, a statistical based approach, a curve-line intersection method, and a hypothesis-based method.

27. The system of claim 24, wherein the computing device configured to predict is further configured to predict the future occurrence of at least one streak by predicting at least one of how long a current streak will continue, when a current streak will end, and when a new streak will begin.

28. The system of claim 24, further comprising a computing device including one or more processors configured to calculate variation (Z') of values inside a particular streak as follows:

$$Z'=(\Sigma Y(i)-Y(\text{avg}))/l$$

wherein l denotes a length of the streak, Y(i) denotes a particular value in the streak and Y(avg) denotes a mean of values in the streak.

29. Computer-readable code stored on a computer-readable medium that, when executed by a processor, performs a method for identifying performance regions in time-series data, the method comprising:
identifying, with one or more computing devices including one or more processors, one or more streaks in the time-series data based on at least one streak parameter;
ranking, with the one or more computing devices including the one or more processors, the identified streaks based on at least variations of values inside the streaks, wherein streaks are compared among similar kinds of streaks such that steaks with increasing variations are compared, streaks with decreasing variations are compared, and streaks with relatively constant variations are compared; and
predicting, with the one or more computing devices including the one or more processors, a future occurrence of at least one streak based on characteristics of the identified streaks.

30. The computer-readable code of claim 29, wherein the streak parameters include a threshold performance parameter and a streak length parameter.

31. The computer-readable code of claim 29, wherein the steps of identifying and ranking are carried out using at least one of a linear graph method, a statistical based approach, a curve-line intersection method, and a hypothesis-based method.

32. The computer-readable code of claim 29, wherein the step of predicting the future occurrence of at least one streak comprises predicting at least one of how long a current streak will continue, when a current streak will end, and when a new streak will begin.

33. The computer-readable code of claim 29, further comprising:
calculating, with the one or more computing devices including the one or more processors, variation (Z') of values inside a particular streak as follows:

$$Z'=(\Sigma Y(i)-Y(\text{avg}))/l$$

wherein l denotes a length of the streak, Y(i) denotes a particular value in the streak and Y(avg) denotes a mean of values in the streak.

* * * * *